(12) United States Patent
Itakura et al.

(10) Patent No.: US 6,874,594 B2
(45) Date of Patent: Apr. 5, 2005

(54) CONTROLLER FOR ELECTRIC POWER STEERING SYSTEM

(75) Inventors: Yusuke Itakura, Gunma (JP); Hisayoshi Koiwai, Gunma (JP)

(73) Assignee: NSK Ltd., Tokyo (JP)

( * ) Notice: Subject to any disclaimer, the term of this patent is extended or adjusted under 35 U.S.C. 154(b) by 114 days.

(21) Appl. No.: 10/264,007

(22) Filed: Oct. 2, 2002

(65) Prior Publication Data

US 2003/0075379 A1 Apr. 24, 2003

(30) Foreign Application Priority Data

Oct. 4, 2001 (JP) ........................................ 2001-308175

(51) Int. Cl.[7] ................................................. B62D 5/04
(52) U.S. Cl. ........................................ 180/446; 701/41
(58) Field of Search ............................ 180/446; 701/41, 701/42, 43; 318/430–433; 702/64, 65

(56) References Cited

U.S. PATENT DOCUMENTS

| | | | | |
|---|---|---|---|---|
| 5,809,438 A | * | 9/1998 | Noro et al. ................... 701/41 |
| 6,013,994 A | * | 1/2000 | Endo et al. .................. 318/432 |
| 6,505,132 B1 | * | 1/2003 | Takaku ......................... 702/65 |
| 6,665,599 B2 | * | 12/2003 | Kogiso et al. ................ 701/41 |
| 2001/0002631 A1 | * | 6/2001 | Okanoue et al. ............ 180/446 |
| 2002/0033300 A1 | * | 3/2002 | Takeuchi et al. ............ 180/446 |

FOREIGN PATENT DOCUMENTS

| | | |
|---|---|---|
| JP | 8-1754 | 1/1996 |
| JP | 8-175405 | 7/1996 |
| JP | 9-24846 | 1/1997 |
| JP | 11-217080 | 8/1999 |
| JP | 2002-029432 | 1/2002 |

* cited by examiner

Primary Examiner—Anne Marie Boehler
(74) Attorney, Agent, or Firm—Sughrue Mion, PLLC (57) ABSTRACT

To provide a controller for an electric power steering system capable of balancing a steering assist force by correcting an offset and improving the steering feeling. A controller for an electric power steering system having motor driving means for driving a motor for electric power steering and motor current detecting means for detecting a current running through the motor is used in which the motor-driving means realizes a motor stop state in which no current runs through the motor under a non-energized state, uses a motor current detection signal under the motor stop state as the offset value of the motor current detecting means, and automatically corrects the offset of the motor current detecting means in accordance with the offset value.

2 Claims, 11 Drawing Sheets

CONTROLLER FOR ELECTRIC POWER STEERING SYSTEM

BACKGROUND OF THE INVENTION

1. Field of the Invention

The present invention relates to a controller for an electric power steering system for providing a steering assist force by a motor to steering systems of an automobile or a vehicle, particularly to a controller for an electric power steering system for automatically correcting an offset of a motor-current detection system and balancing the steering assist force so as to improve the steering feeling.

2. Description of the Prior Art

An electric power steering system for auxiliary-load-energizing the steering system of an automobile or a vehicle with the rotating force of a motor is designed to energize an assist force to a steering shaft or a rack shaft by a transmission mechanism such as a gear or a belt through a decelerator. This conventional electric power steering system performs feedback control of a motor current in order to accurately generate an assist torque(steering auxiliary torque). The feedback control adjusts a motor-applied voltage so that the difference between a current control value and a motor current detection value decreases, and the motor-applied voltage is generally adjusted by adjusting the duty ratio of PWM(pulse-width modulation) control.

Figure 1:
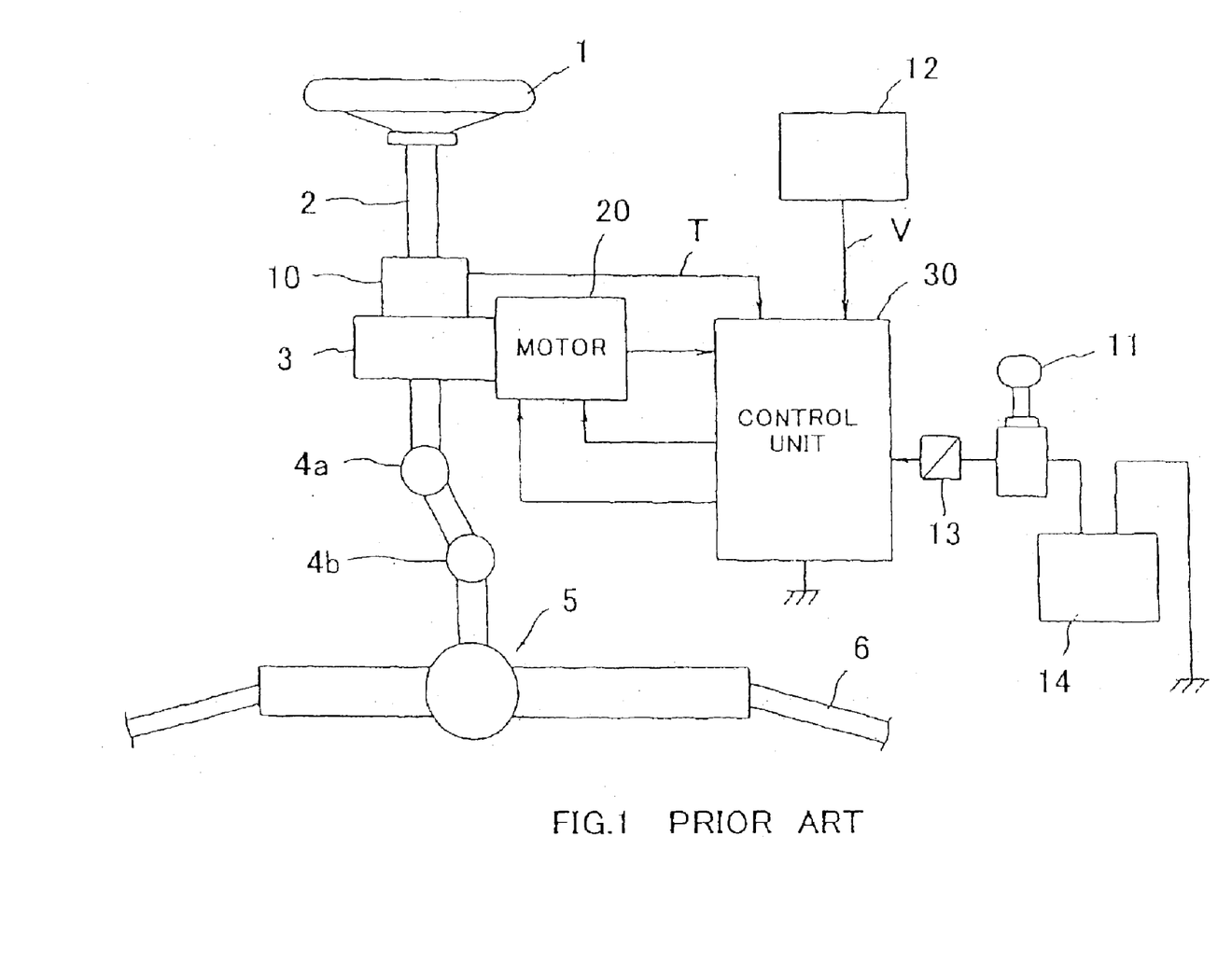
FIG. 1 is a block diagram showing an electric power steering system.

Then, a general configuration of an electric power steering system is described below by referring to FIG. 1. A shaft 2 of a steering handle 1 is connected to tie rods 6 of a steering wheel through a deceleration gear 3, a universal joints 4a and 4b and a pinion rack mechanism 5. The shaft 2 is provided with a torque sensor 10 for detecting the steering torque of the steering handle 1 and a motor 20 for auxiliary of the steering force of the steering handle 1 is connected to the shaft 2 through the deceleration gear 3. Power is supplied to a control unit 30 for controlling the power steering system from a battery 14 through an ignition key 11 and a relay 13, and the control unit 30 computes a steering assist command value I of an assist command in accordance with a steering torque T detected by the torque sensor 10 and a vehicle speed V detected by a vehicle speed sensor 12 and controls the current to be supplied to the motor 20 in accordance with the computed steering assist command value I.

An electric power steering system using a DC motor realizes an optimum steering force by controlling a motor current. However, because a motor current detection circuit is necessary to control a motor current, such a motor current detection circuit is generally constituted by an analog circuit. The analog circuit latently has a DC offset. Particularly, in the case of a current detection circuit for electric power steering, it is necessary to detect a large current of tens of amperes at a low voltage of 12[V] and a high resolution. Therefore, it is necessary to amplify a signal having a small potential difference up to the maximum value of a detection range. Therefore, when using the above high-gain amplifier, a problem occurs that a latent offset is also amplified and increased. When the above offset is present, a problem occurs that a current seems to flow though the current does not actually flow and thereby, a preferable assist cannot be performed.

The above offset value is conventionally set so that the characteristic of a current detection circuit does not influence the maximum value of offset values which may be generated and the whole system is not influenced even if an offset is generated.

Figure 2:
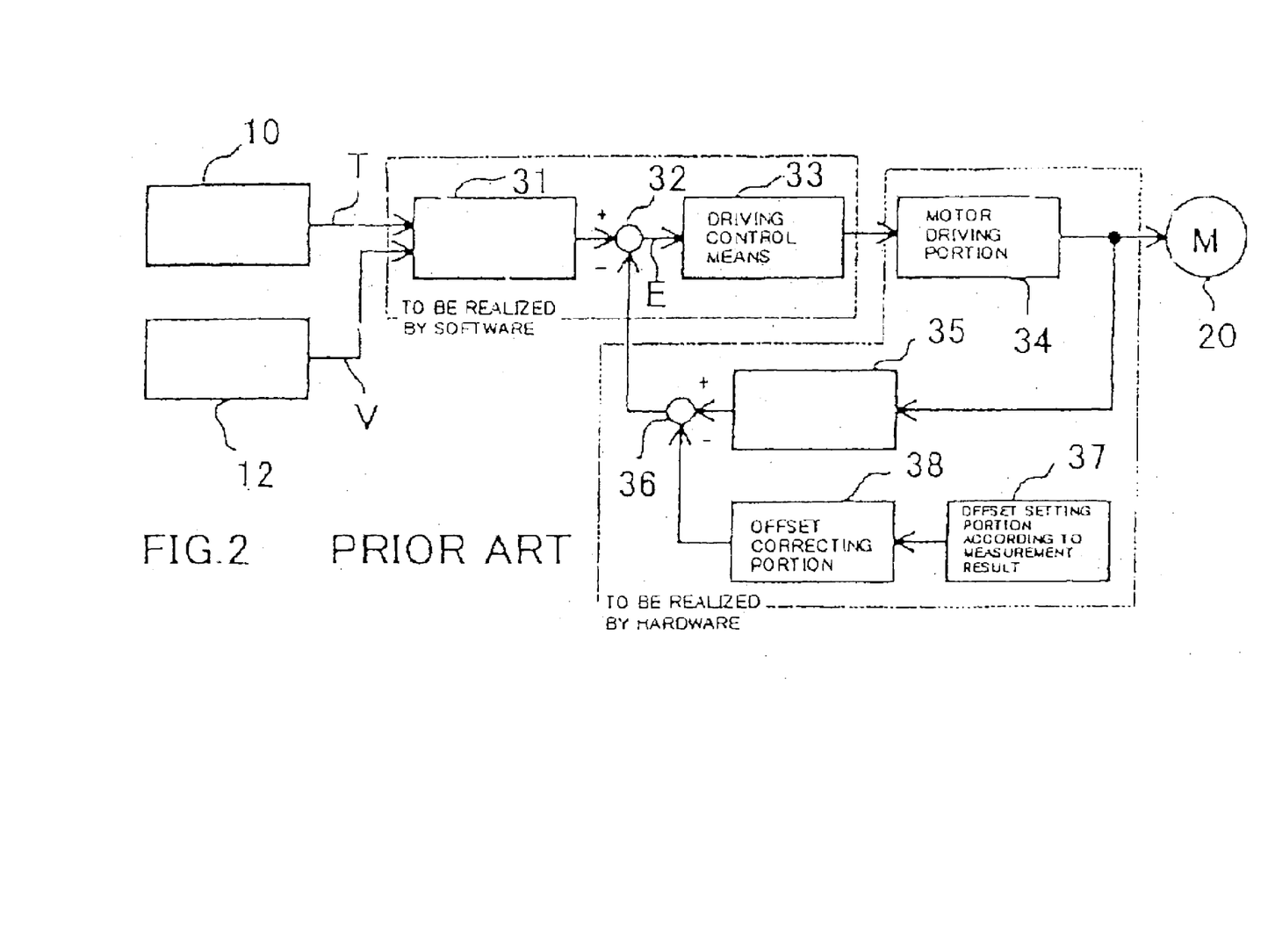
FIG. 2 is a functional block diagram functionally showing a general internal configuration of a control unit.

FIG. 2 shows a configuration of the control unit 30 having an offset correcting function, which is divided into a realizing portion by software and a realizing portion by hardware. The steering torque T detected by the torque sensor 10 and the vehicle speed V detected by the vehicle speed sensor 12 are inputted to a current command computing portion 31. The current command computing portion 31 computes and decides the steering assist command value I which is the control target value of a current to be supplied to the motor 20. The steering assist command value I is inputted to a subtracter 32 and a current control value E which is a subtraction result by the subtracter 32 is inputted to a motor driving portion 34 through a driving control means 33, and the motor 20 is driven by the motor driving portion 34. The current of the motor driving portion 34 is detected by a current detecting portion 35 and a current detection signal is inputted to a subtracter 36. Moreover, an offset value from an offset setting portion 37 according to a measurement result is inputted to an offset correcting portion 38, a correction signal from the offset correcting portion 38 is inputted to the subtracter 36, and a corrected current detection signal from the subtracter 36 is inputted to the subtracter 32.

Figure 3:
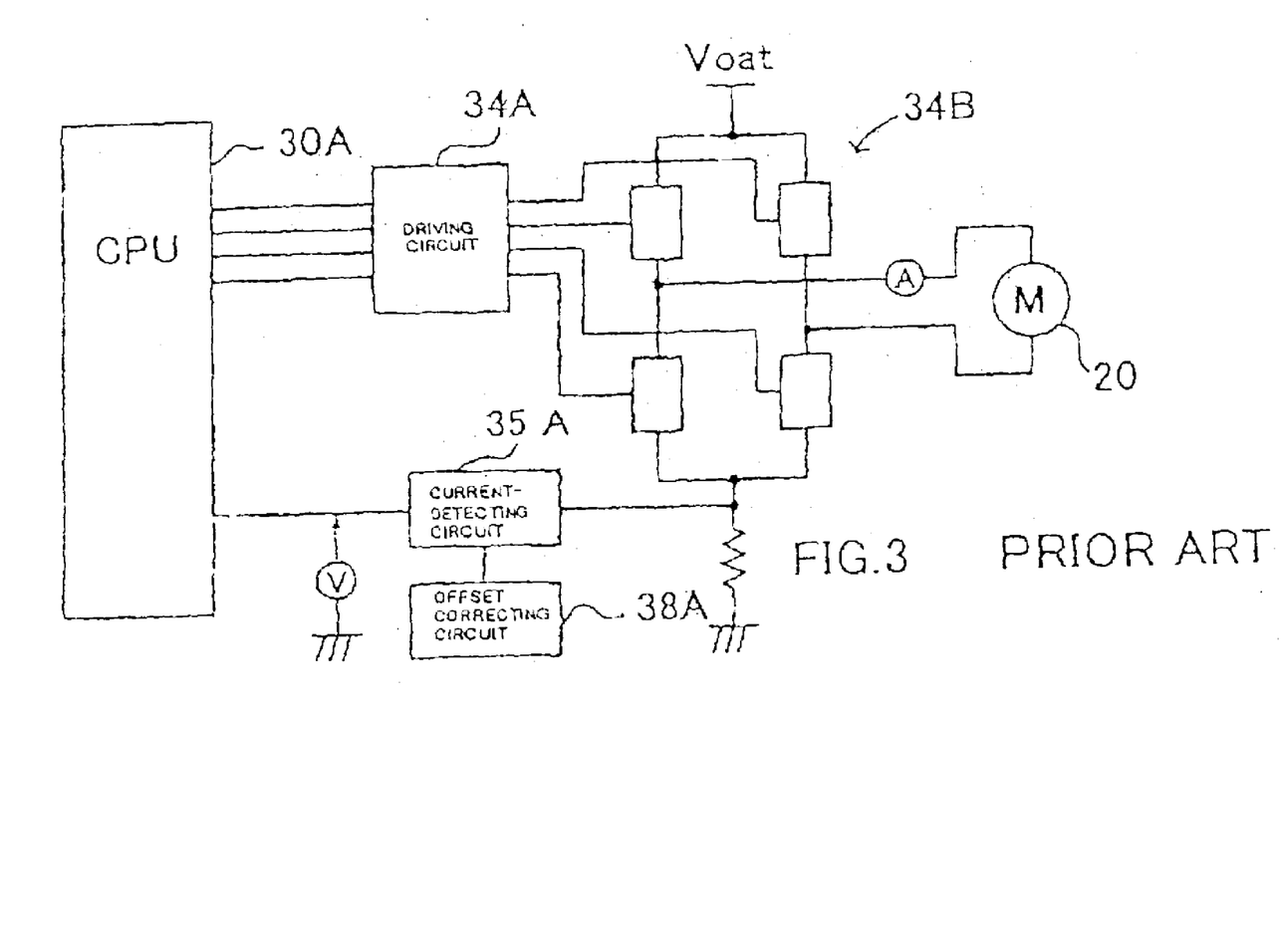
FIG. 3 is a circuit block diagram showing one example of a hardware configuration in a control unit.

Moreover, to correct an offset by hardware, the circuit configuration shown in FIG. 3 is set to a state in which an output of the output-driving circuit 34A of a CPU 30A is turned off, that is, a current(A) circulating through the motor 20 becomes "0" and the then output voltage(V) of a current detecting circuit 35A is measured to adjust an offset correcting circuit 38A so that the voltage(V) becomes "0".

However, in the case of the method where the characteristic of a current detecting circuit is set so that it does not influence the maximum value of offset values which may be generated, there is no problem when an offset which may be generated to a resolution necessary for control is small enough. However, when a large offset is generated, problems occur that a necessary resolution is not obtained but a scale much larger than a scale necessary for control must be set and only a performance far behind a performance which can be originally realized to correct an offset can be realized.

Moreover, as shown in FIG. 2, a system provided with components(the current detecting portion 35, the offset setting portion 37 and the offset-correcting portion 38) capable of previously correcting an offset by the hardware has problems that an extra circuit is necessary to adjust the system, it takes a lot of time to adjust the system, and the manufacturing cost is increased in any case. Furthermore, to realize an electric power-steering system having a higher performance, it is necessary to further raise the resolution of a current detecting circuit and thereby, the resolution of offset correcting means must be raised, and thus, it is necessary to more severely adjust the offset correcting means.

That is, because an offset is conventionally corrected by hardware, a circuit for correction is necessary, excessive component cost and mounting area are necessary and moreover, man-hours for the correction are necessary and therefore, the cost for adjusting the circuit is increased. Furthermore, there is a problem that when using a variable resistor(trimmer) in order to realize a correcting circuit, an adjustment error becomes small but a positional shift after adjustment may occur. On the other hand, when using an adjusting resistor(selection of fixed resistor) in order to realize a correcting circuit, there is a problem that an adjustment error becomes large though no shift occurs after adjustment. Because of selection from a commercial fixed resistor in variation, there is a disadvantage that it is impos-

SUMMARY OF THE INVENTION

The present invention is made to solve the above problems and its object is to provide a controller for an electric power steering system capable of balancing a steering assist force by correcting the offset of a motor current detecting system and improving the steering feeling.

The present invention relates to a controller for an electric power steering system comprising motor driving means for driving an electric power steering motor and a motor current detecting means for detecting a current running through the motor. The above object is achieved by realizing a motor stop state in which no current runs through the motor in such a manner that the motor driving means is not energized, using a motor current detection signal under the motor stop state as the offset value of the motor current detecting means, and automatically correcting the offset of the motor current detecting means in accordance with the offset value.

Moreover, the above object of the present invention is more effectively achieved by storing the offset value in a storing portion, or automatically correcting the offset in accordance with the added value of a standard offset value according to a designed value and the difference between the offset value and the standard value, or storing the difference between the offset value and the standard value according to the designed value in the storing portion and automatically correcting the offset in accordance with the added value of the standard value and the stored value.

DESCRIPTION OF THE PREFERRED EMBODIMENTS

In the case of the present invention, the offset of a current detecting portion(current detecting circuit) is automatically corrected. Therefore, an extra circuit for adjustment is unnecessary while keeping a resolution necessary for control and it is possible to realize a controller for a high-performance and inexpensive electric power steering system because the adjustment of the circuit is unnecessary.

When further improving the resolution of a current detecting circuit in order to realize a high-performance electric power steering system, an automatic correction is performed by software in the case of the present invention. Therefore, this is a correction method also suitable for performance improvement because improvement of the resolution of a detecting circuit automatically improves a resolution of a correcting means. Means for correcting an offset corrects the offset in accordance with the added value of a standard value(reference value assumed for design) according to a designed value and the difference between a measured offset value and the standard value. Therefore, even if measurement of an offset fails or a step of correcting an offset is skipped, it is possible to prevent considerable deterioration of a performance.

Embodiments of the present invention are described below by referring to the drawings.

Figure 4:
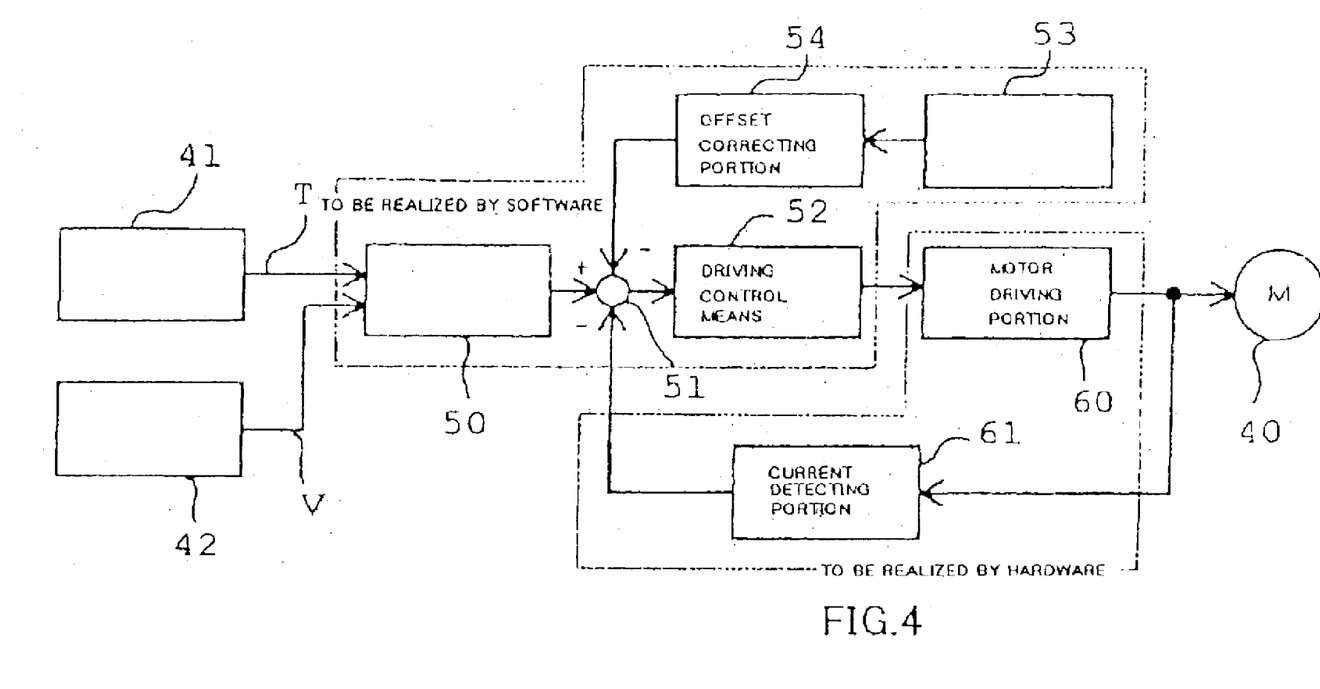
FIG. 4 is a block diagram showing a configuration of a first embodiment of the present invention.

FIG. 4 is a block diagram showing a configuration of a first embodiment of the present invention, in which a steering torque signal T from a torque sensor 41 and a vehicle speed signal V from a vehicle speed sensor 42 are inputted to a current command computing portion 50 and a computed current command value is inputted to an adder-subtracter 51. An output of the adder-subtracter 51 is inputted to a driving control means 52 and the driving control means 52 drives a motor 40 for generating an assist steering force of a steering system through a motor driving portion 60. A motor current is detected by a current detecting portion 61 and a current detection signal is inputted to the adder-subtracter 51. Moreover, a measured offset value 53 according to a measurement result is inputted to an offset correcting portion 54 and the adder-subtracter 51 and a current detection signal from the current detecting portion 61 is offset-corrected.

Figure 5:
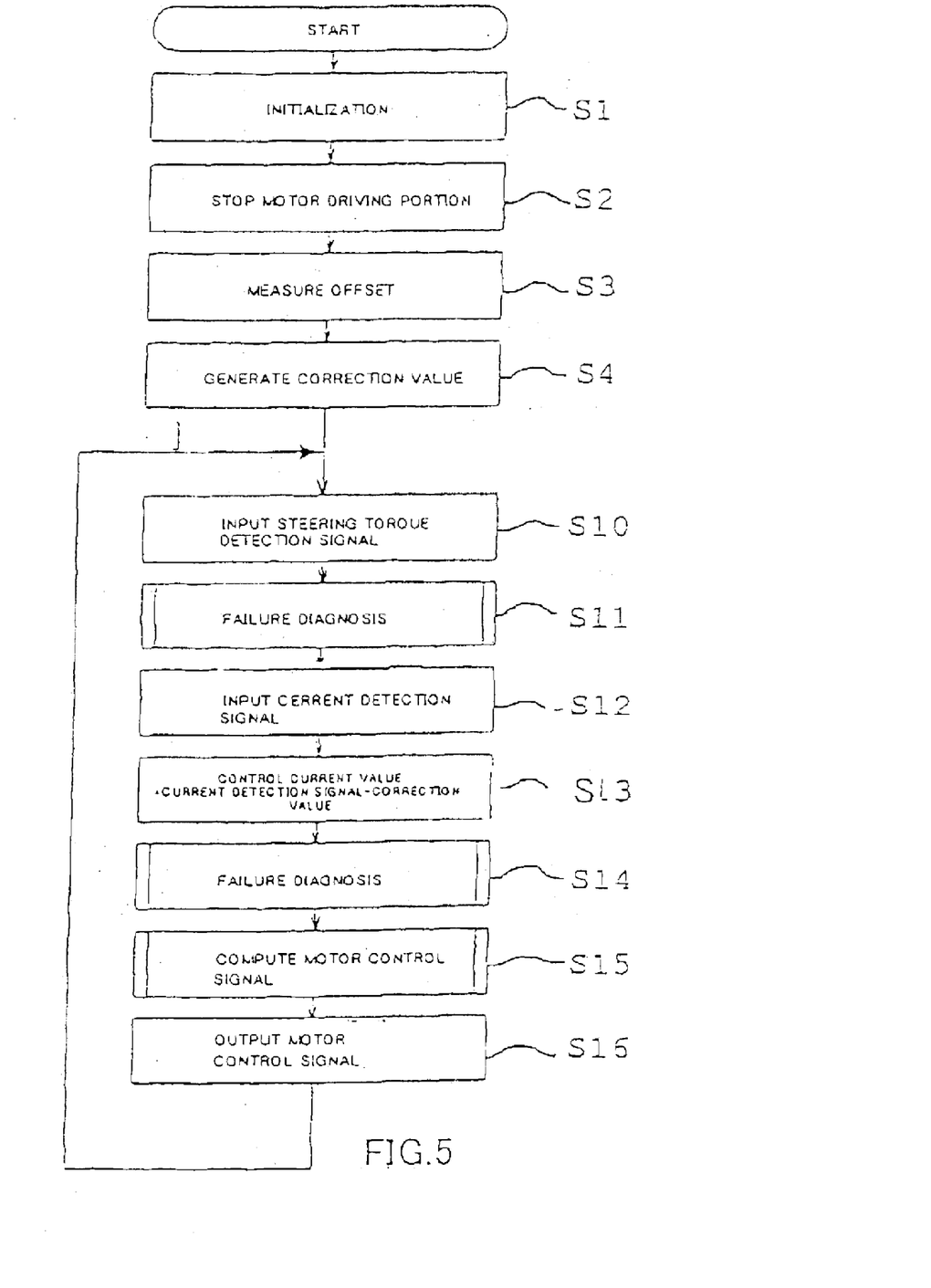
FIG. 5 is a flowchart showing operations of the first embodiment.

Operations of the above configuration are described below by referring to the flowchart in FIG. 5.

First, initialization is performed by software(Step S1) and the motor driving portion 60 before being activated is stopped before supplying a current to the motor 40 after initialization is completed(Step S2). Under the stopped state, no current is run through the motor 40. However, because the current detecting portion 61 is electrically kept turned-on, a current detection signal inputted to a CPU(controller) from the current detecting portion 61 becomes only an offset value of a circuit system. Therefore, by reading the offset value converted to A/D, it is possible to obtain a measurement of an offset value, that is, a measured offset value(Step S3). A correction value is generated in accordance with the measured offset value(Step S4). The correction value directly serves as an offset value when the scale of a motor current value for normal control is equal to that of an inputted motor current value.

Then, normal control is started, the steering torque signal T from the torque sensor 41 is A/D-converted and inputted (Step S10), failure diagnosis to check whether the signal T is an abnormal value is performed(Step S11), and a current detection signal from the current detecting portion 61 is A/D-converted and inputted(Step S12). Then, a value obtained by subtracting a correction value of the offset correcting portion 54 from the current detection signal is used as a current detection signal(control current value) for control(Step S13), and failure diagnosis to check whether the signal is an abnormal value is performed(Step S14). Moreover, a motor control signal is computed by using the inputted current detection signal(control current value)(Step S15). The motor 40 is controlled in accordance with the computed motor control signal(Step S16) and the step is returned to the above Step S10. By repeating the above normal control, it is possible to perform the assist control of the electric power steering not influenced by the offset of the current detecting portion 61.

Figure 6:
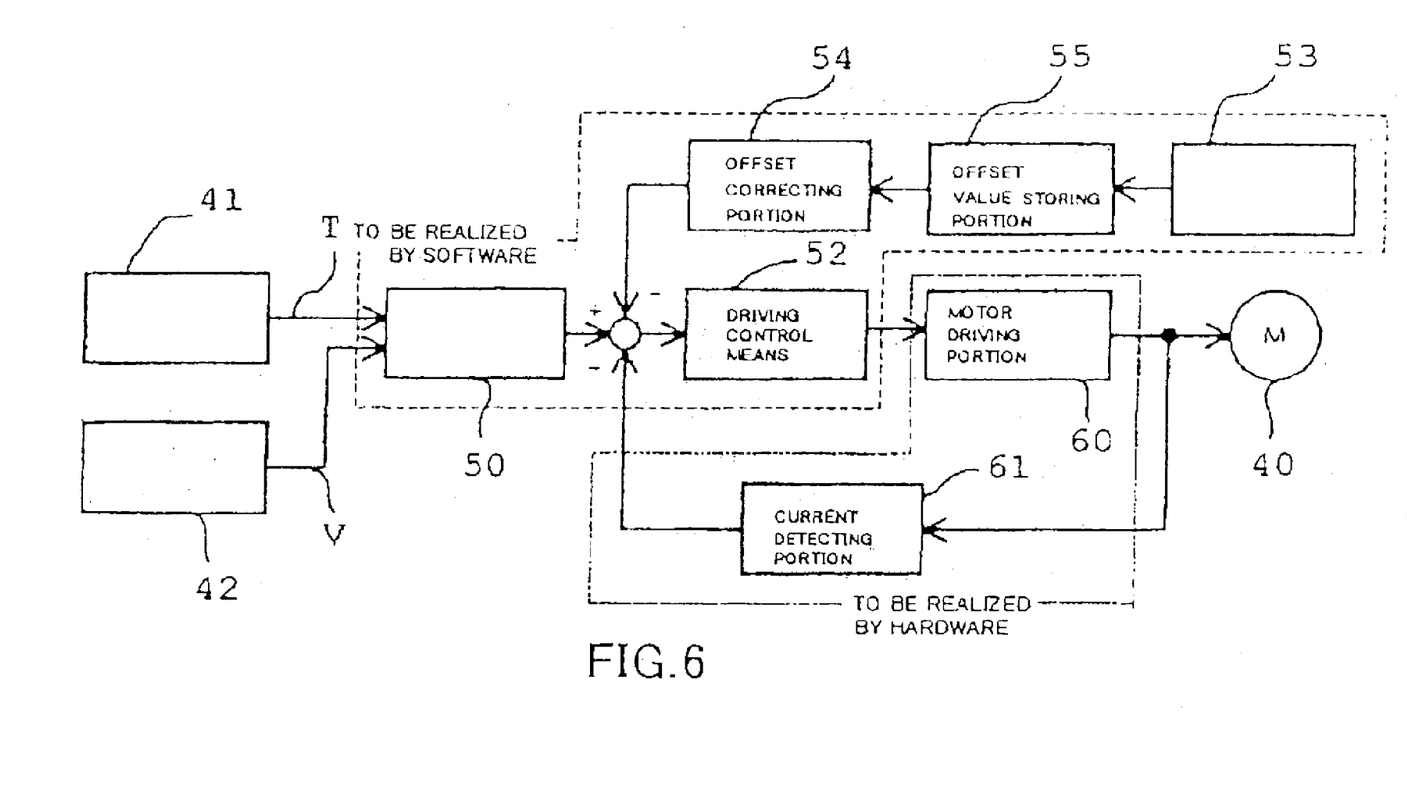
FIG. 6 is a block diagram showing a configuration of a second embodiment of the present invention.

FIG. 6 shows a second embodiment of the present invention in relation to FIG. 4, which has a configuration of storing a measured offset value in a offset-value-storing portion(such as a nonvolatile memory) serving as an external storage device. In this case, because the offset value of hardware is decided when fabricated, measurement of an offset is stably performed under fabrication by using a configuration of storing a measured offset value only once under fabrication and it is possible to suppress the influence of disturbance(noise or power source fluctuation, etc.) and realize stable correction at a high accuracy.

Figure 7:
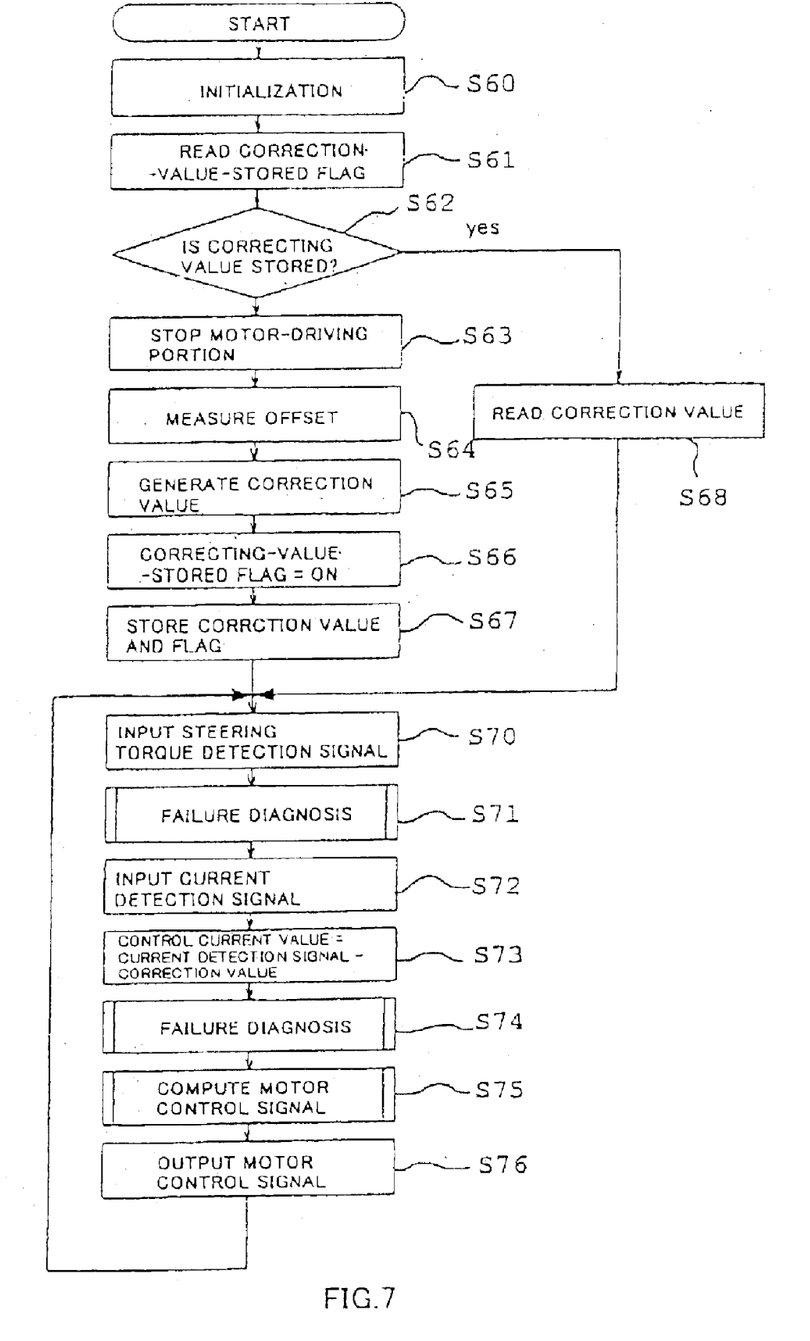
FIG. 7 is a flowchart showing operations of the second embodiment.

Operations of the second embodiment are described below by referring to the flowchart in FIG. 7.

Initialization is first performed by software(Step S60) and a correction-value-stored flag is read from an offset-value-storing portion 58(Step S61) to determine whether a correction value is stored(Step S62). When it is determined that the correction value is stored, an offset correction value is read and the step is skipped to Step S70(Step S68). However, when it is determined in Step S62 that the correction value is not stored, the motor driving portion 60 is stopped(Step S63), an offset value is measured(Step S64), a correction value is generated in accordance with the measured offset value(Step S65), and the correction-value-stored flag is turned on(Step S66). Then, the correction value and correction-value-stored flag are stored in the offset-value-storing portion 58(Step S67).

Then normal control is started, the steering torque signal T is inputted(Step S70), failure diagnosis is performed(Step S71), and a current detection signal is inputted from the current-detecting portion 61(Step S72). A value obtained by subtracting the correction value from the current detection signal is used as a current control signal(control current value) for control(Step S73) to perform the failure diagnosis to check whether the current control signal is an abnormal value(Step S74). Then, a motor control signal is computed by using the inputted current control signal(Step S75) to control a motor in accordance with the computed motor control signal(Step S76). By repeating the above normal control, it is possible to perform the assist control of the electric power steering not influenced by the offset of the current detecting portion 61.

Figure 8:
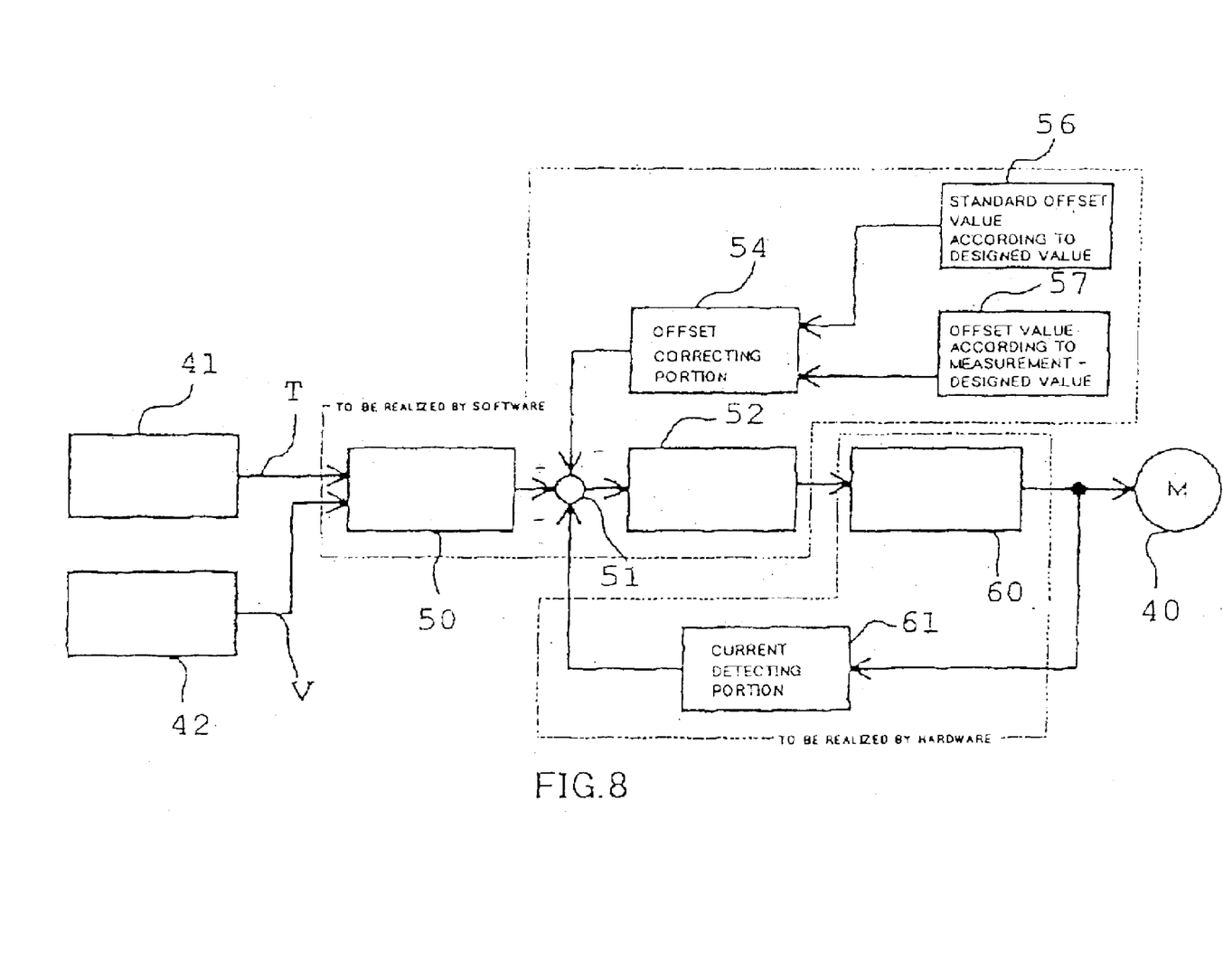
FIG. 8 is a block diagram showing a configuration of a third embodiment of the present invention.

FIG. 8 shows a third embodiment of the present invention in relation to FIG. 4, which is an example of performing offset correction by adding a standard offset value 56 according to a designed value and the difference 57 between a measured offset value and the standard offset value according to the designed value. The offset value used for correction in this embodiment includes a standard offset value according to a designed value which can be considered for design generated because the current detecting portion 61 is constituted by an analog circuit and an measured offset value generated due to the solid difference between devices. To constitute a high-performance electric power steering system, it is indispensable to obtain a high and stable performance by using high-accuracy components because the current detecting portion 61 becomes a very important portion. Therefore, because a standard offset value which can be considered for design is large in the whole offset value, it is possible to prevent the whole system from being greatly damaged even if a trouble occurs in measurement of an offset due to power-source fluctuation or noises, etc. by separately correcting the standard offset value 56 in accordance with the designed value and the measured offset value 57 due to the solid difference by measurement. To realize the above configuration, it is naturally necessary to previously set an estimated maximum range for the offset measurement according to the solid difference and measure an offset value not coinciding with the range again or output a warning as a trouble.

Figure 9:
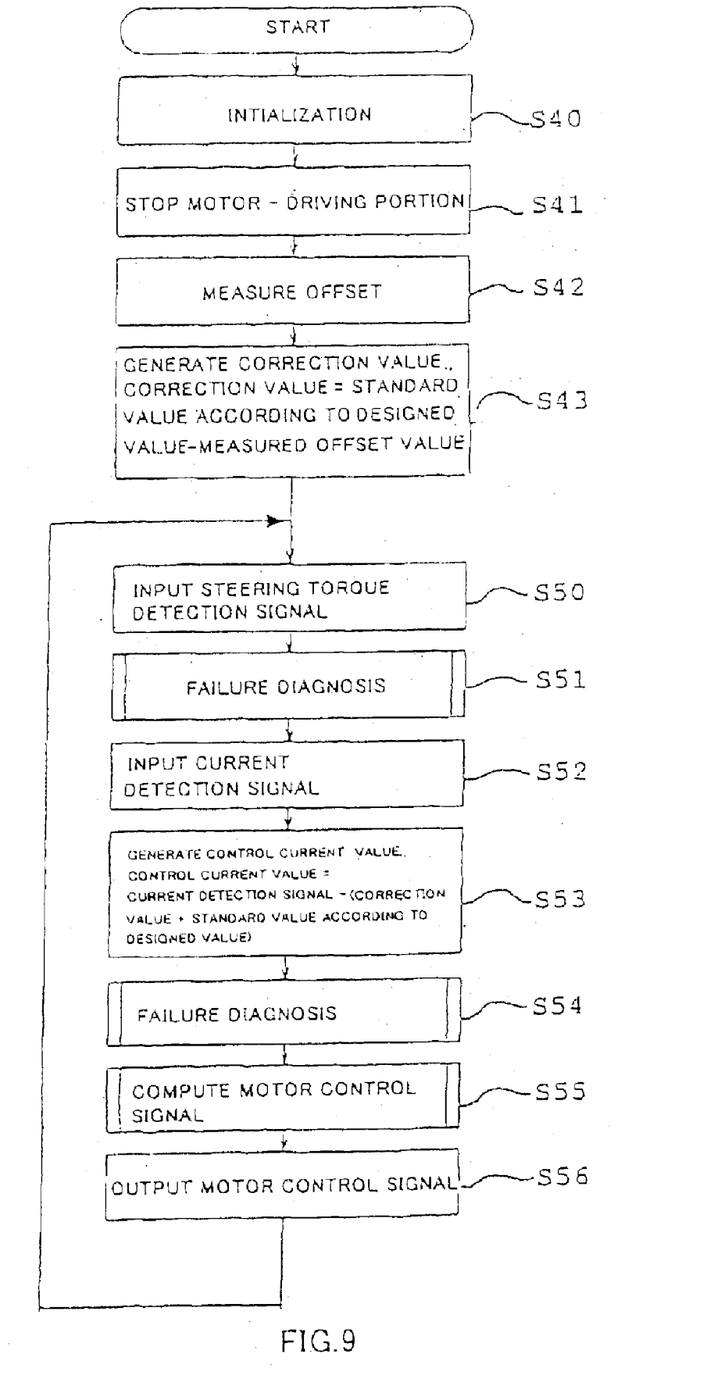
FIG. 9 is a flowchart showing operations of the third embodiment.

Operations of the third embodiment are described by referring to the flowchart in FIG. 9.

Initialization is first performed by software(Step S40), the motor driving portion 60 is stopped(Step S41) and an offset value is measured(Step S42) to generate a correction value in accordance with the difference 57 between the measured offset value and a standard offset value according to a designed value(Step S43).

Then, normal control is started, the steering torque signal T is inputted(Step S50), failure diagnosis to check whether the signal is an abnormal value is performed(Step S51), and a current detection signal from the current-detecting portion 61 is inputted(Step S52). A value obtained by subtracting "correction value+standard offset value according to designed value" from the current detection signal as a current detection signal(control current value) for control (Step S53) to perform failure diagnosis to check whether the signal is an abnormal value(Step S54). Then, a motor control signal is computed by using the inputted current detection signal(Step S55) to control the motor 40 in accordance with the computed motor control signal(Step S56). By repeating the above normal control, it is possible to perform the assist control not influenced by the offset of the current-detecting portion 61.

Figure 10:
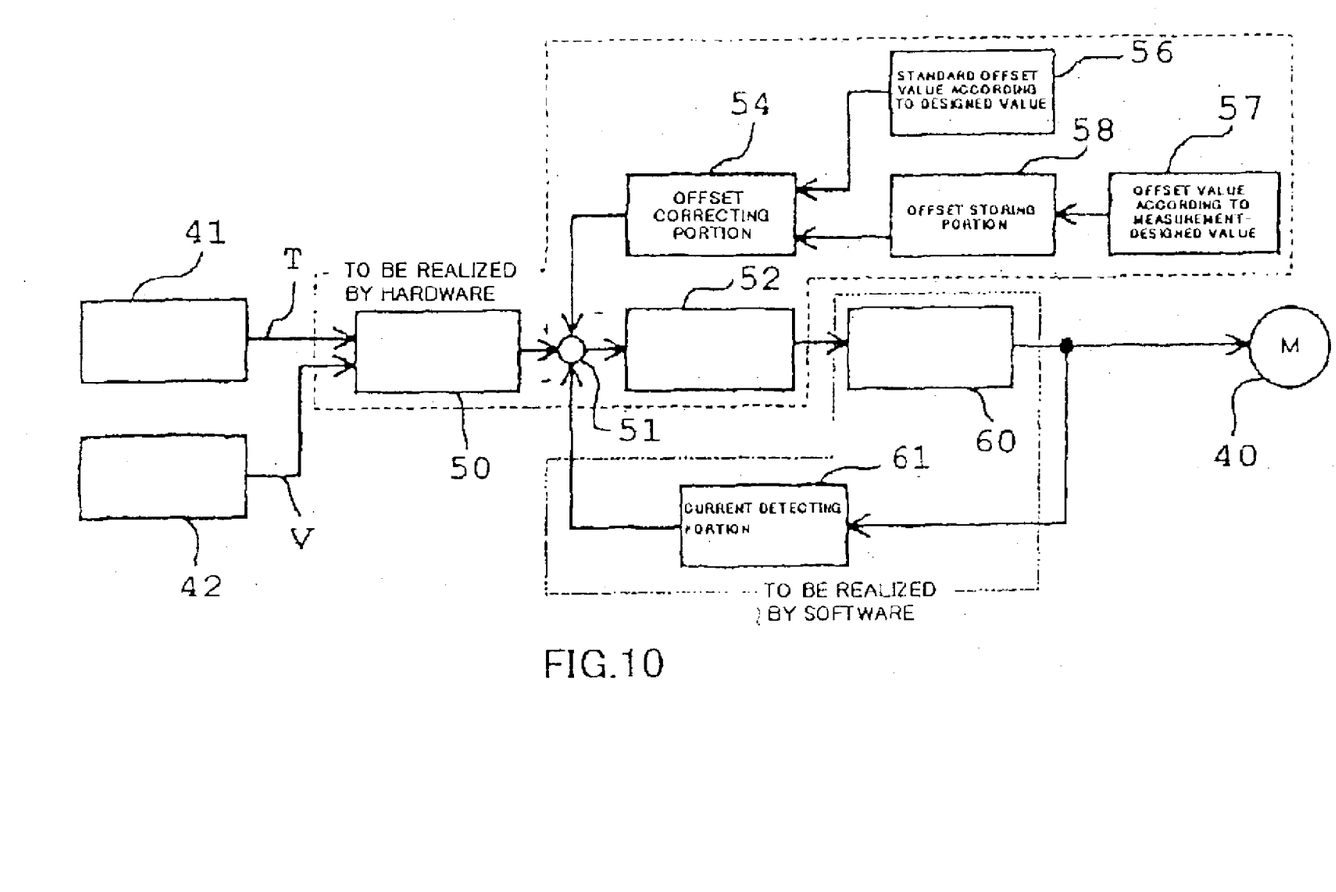
FIG. 10 is a block diagram showing a configuration of a fourth embodiment of the present invention.

FIG. 10 shows a fourth embodiment of the present invention in relation to FIG. 8, which is provided with an offset storing portion(e.g. nonvolatile memory) 58 for adding and correcting a standard offset value according to a designed value and the difference 57 between a measured offset value and the standard offset value according to the designed value as well as storing the difference 57.

Figure 11:
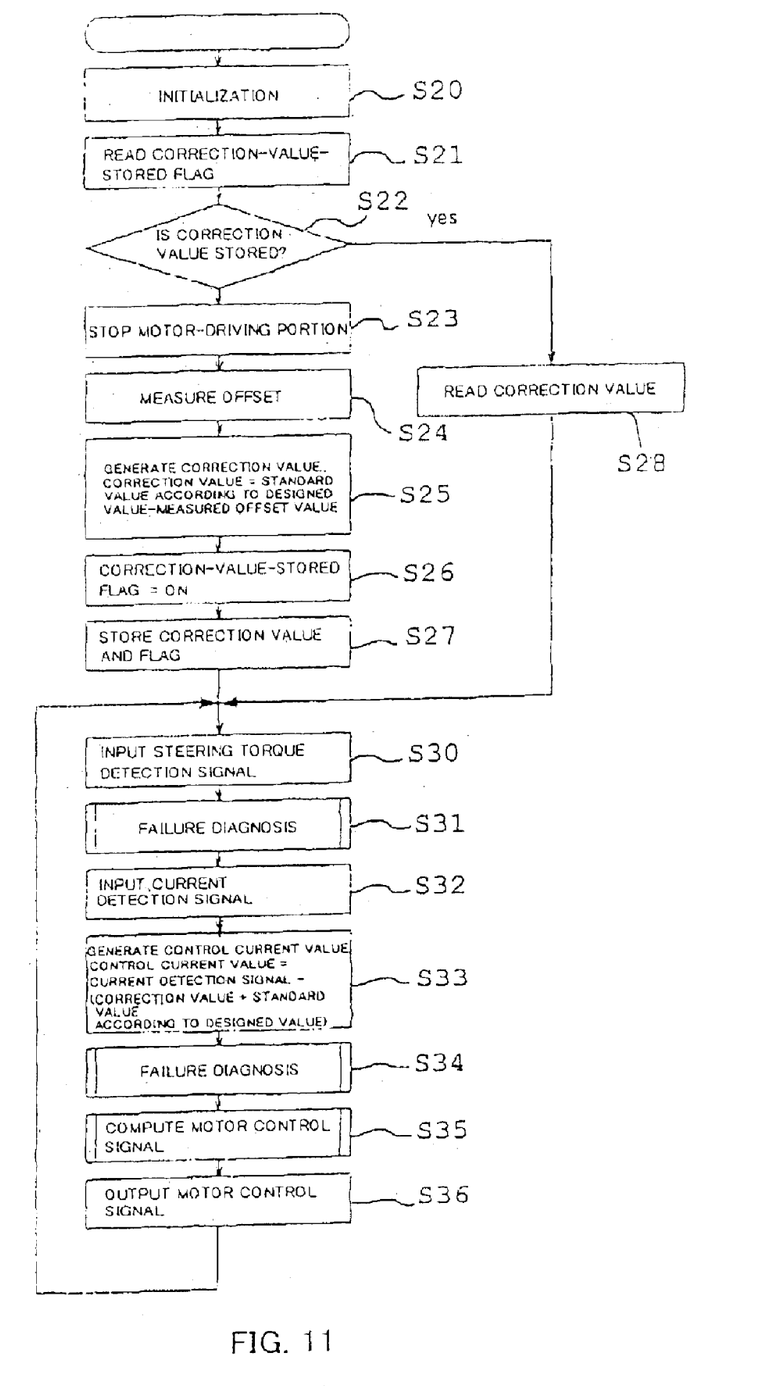
FIG. 11 is a flowchart showing operations of the fourth embodiment.

Operations of the fourth embodiment are described below by referring to the flowchart in FIG. 11.

An initialization is first performed by software(Step S20) and a correction-value-stored flag is read from an offset storing portion(Step S21) to determine whether a correction value is stored(Step S22). When it is determined that the correction value is stored, an offset correction value is read to skip to Step S30(Step S28). Moreover, when it is determined in the above Step S22 that no corrected value is stored, the motor driving portion 60 is stopped(Step S23) and an offset value is measured the same as the above described to generate a correction value in accordance with the measured offset value(Step S25). The correction value is generated by computing the difference between a standard value according to a designed value and a measured offset value. Moreover, the correction-value-stored flag is turned on(Step S26) to store the correction value and correction-value-stored flag in a offset-value-storing portion 55(Step S27).

Then, normal control is started, the steering torque signal T is inputted(Step S30), failure diagnosis to check whether the signal is an abnormal value is performed(Step S31), and a current detection signal from the current detecting portion 61 is inputted(Step S32). A value obtained by subtracting a correction value from the current detection signal is used as a current detection signal(control current value) for control (Step S33). That is, the difference between the current detection signal and the added value of the correction value and a standard value according to a designed value is used as the control current value. Then, failure diagnosis to check whether the control current value is an abnormal value is performed(Step S34) and a motor control signal is computed by using the inputted control current value(Step S35) to control the motor 40 in accordance with the computed motor control signal(Step S36). By repeating the above normal control, it is possible to perform the assist control of electric power steering not influenced by the offset of the current-detecting portion 61.

As described above, by separately correcting a designed standard offset value and a measured offset value, it is possible to prevent a system from being damaged due to power-source fluctuation or noises, etc. Moreover, there is an advantage that a measured offset value can be stored only once under a stable state in fabrication. Because a measured offset value is generally smaller than a designed standard offset value, it is possible to prevent a system from being damaged even if write of an offset value fails in a production process or a step of writing an offset value is erroneously slipped by storing only a measured offset value and separately correcting the designed standard offset value and the measured offset value(previously restricting the correction value of the measured offset value).

The present invention can be applied to every electric power-steering system independently of the type of an electric power steering system(column type, pinion type, or rack type, etc.) and the type of a motor (brush-provided motor or brushless motor, etc.).

In the case of the present invention, the offset of a hardware-constituted current detecting portion is automatically corrected in accordance with a software technique. Therefore, an extra circuit for adjustment while keeping the resolution necessary for control is unnecessary and it is unnecessary to adjust the circuit. Thereby, it is possible to realize a controller for a high-performance and inexpensive electric power steering system.

Moreover, an offset is corrected in accordance with a value obtained by adding a standard value(reference value assumed for design) according to a designed value and the difference between a measured offset value and the standard value. Therefore, even if measurement of an offset fails, it is possible to prevent a performance from being considerably deteriorated.

Furthermore, when separately correcting a designed standard offset value and a measured offset value, it is possible to prevent a system from being damaged due to power-source fluctuation or noises, etc. and it is enough to store the measured offset value only once under a stable state in fabrication. Because a measured offset value is generally smaller than a designed standard offset value, only the measured offset value is stored and the designed standard offset value and measured offset value are separately stored in the case of the present invention. Therefore, even if write of an offset value fails in a production process, it is possible to prevent a system from being damaged. Moreover, it is possible to prevent a system from being damaged even if a step of writing an offset value is erroneously skipped.

What is claimed is:

1. A controller for an electrical power steering system, comprising a motor driving means for driving a motor for an electrical power steering and a motor current detecting means for detecting a current running through the motor, wherein the motor driving means realizes a motor stop state in which no current runs through the motor under a non-energized state, uses a motor current detection signal while the motor stops as an offset value of the motor current detecting means, and automatically corrects an offset of the motor current detecting means in accordance with an added value of a standard offset value according to a designed value and a difference between the offset value and the standard offset value.

2. A controller for an electrical power steering system, comprising a motor driving means for driving a motor for an electrical power steering and a motor current detecting means for detecting a current running through the motor, wherein the motor driving means realizes a motor stop state in which no current runs through the motor under a non-energized state, uses a motor current detection signal while the motor stops as an offset value of the motor current detecting means, stores a difference between the offset value and a standard offset value according to a designed value in a storing portion, and automatically corrects an offset of the motor current detecting means in accordance with an added value of the standard offset value and the stored value.

* * * * *